United States Patent [19]

Jebens

[11] Patent Number: 5,024,497
[45] Date of Patent: Jun. 18, 1991

[54] SHAPE MEMORY ALLOY OPTICAL FIBER SWITCH

[75] Inventor: Robert W. Jebens, Skillman, N.J.

[73] Assignee: AT&T Bell Laboratories, Murray Hill, N.J.

[21] Appl. No.: 311,567

[22] Filed: Feb. 15, 1989

[51] Int. Cl.⁵ .............................................. G02B 6/36
[52] U.S. Cl. ................................. 350/96.2; 350/96.13; 350/96.15
[58] Field of Search ................. 350/96.13, 96.15, 96.2, 350/96.21

[56] References Cited

U.S. PATENT DOCUMENTS

| | | | |
|---|---|---|---|
| 4,152,043 | 5/1979 | Albanese | 350/96.2 |
| 4,223,978 | 9/1980 | Kummer et al. | 350/96.20 |
| 4,312,561 | 1/1982 | Mead | 350/96.21 |
| 4,337,995 | 7/1982 | Tanaka et al. | 350/96.30 |
| 4,415,229 | 11/1983 | McCullough | 350/96.20 |
| 4,512,627 | 4/1985 | Archer et al. | 350/96.20 |
| 4,610,504 | 9/1986 | Thurenius et al. | 350/96.20 |
| 4,700,541 | 10/1987 | Gabriel et al. | 60/528 |
| 4,759,597 | 7/1988 | Lemonde | 350/96.20 |
| 4,790,624 | 12/1988 | Van Hoye et al. | 350/96.26 |
| 4,832,444 | 5/1989 | Takahashi et al. | 350/96.26 |

FOREIGN PATENT DOCUMENTS

| | | | |
|---|---|---|---|
| 53-112762 | 10/1978 | Japan | 350/96.2 |
| 62-9312 | 1/1987 | Japan | 350/96.14 |
| 62-124519 | 6/1987 | Japan | 350/96.13 |
| 2170615 | 8/1986 | United Kingdom | 350/96.15 |

OTHER PUBLICATIONS

J. D. Crow, Fiber-Optical Switch, IBM TDB vol. 21, No. 11, Apr. 1979, p. 4686.

Primary Examiner—William L. Sikes
Assistant Examiner—John Ngo
Attorney, Agent, or Firm—Jerry W. Herndon; Gordon E. Nelson

[57] ABSTRACT

An optical fiber switch in which a switchable fiber is switched to a first position by a first member inside the housing made of a shape memory material. This first member attempts to restore itself to an original shape heated above a first temperature and, in so doing, exerts a switching force on the switchable fiber. In a preferred embodiment, biasing means push the switchable fiber into a second position when the first means is below a second temperature. The first member exerts a force on the switchable fiber in a direction opposite to that of the biasing means of sufficient force to overcome the biasing force when the first member is above the first temperature. When the shape memory member is cooled, it assumes a distorted shape which allows the biasing means to control the position of the switchable fiber. In one embodiment, the biasing means is a second member also made of a shape memory material. In this embodiment, the first and second shape memory members are heated and cooled in opposite phases to achieve switch operation and release.

24 Claims, 3 Drawing Sheets

SHAPE MEMORY ALLOY OPTICAL FIBER SWITCH

TECHNICAL FIELD

The invention relates generally to the field of optics and particularly to optical fiber switches which are operated under the control of alloys which have properties of shape distortion and restoration when cooled and heated.

BACKGROUND OF THE INVENTION

Optical fibers are increasingly being used in a number of industries and hold future promise for many other industries. For example, telecommunications systems are presently using optical fibers to transmit thousands of telephone calls. These fibers must be aligned with ultra high reliability to other fibers, lasers, and light detectors with micron accuracy, and in some instances with tenth micron accuracy. Local area networks are beginning to use optical fibers for networking. Eventually, it is expected that optical fibers will be used to distribute services to the home market. As these fibers are used more extensively, it is imperative to find inexpensive ways to align, maintain alignment, and switch fibers.

A number of different designs of optical fiber switches are known. A typical form of such a switch is a single pole-double throw in which one fiber is physically moved into optical connection with one of two other fibers in response to some form of stimulus. Other forms, such as single pole-single throw or double pole-double throw, are also common. It is known to operate such switches by electromagnetic and electrostatic forces. Each type has inherent advantages and disadvantages. A major disadvantage of electrostatic switches has traditionally been the high voltage required to generate a sufficiently high electrostatic field to operate a switch. Typically, voltages in the range of four hundred volts have been required. U.S. Pat. No. 4,152,043, issued to A. Albanese, and entitled "Electrostatic Optical Switch with Electrical Connection to Coated Optical Fiber" describes such a switch requiring high voltage for operation. Voltages this high are incompatible with many applications. Electromagnetic switches, on the other hand require substantial continuous electrical current to maintain an operated condition of a switch. In general, most optical fiber switches haven proven to be relatively expensive. Recently, however, simpler designs been found which appear promising. Nevertheless, presently known designs do not satisfy the requirements of all potential applications. Therefore, the need continues for simpler, less expensive designs which conserve resources, such as voltage and current.

SUMMARY OF THE INVENTION

An optical fiber switch comprises a switch housing having an internal first channel extending from an outside surface of the housing for receiving a first switchable fiber and a second channel extending from an outside surface of the housing for receiving a second fiber. The ends of the fibers are in optical alignment when the switchable fiber is in one position in the first channel and in nonalignment when the switchable fiber is in another position in the first channel. A first member inside the housing is made of a shape memory material which has the property of shape restoration substantially to an original state when heated above a first temperature after being distorted from the original shape when below a second temperature. This first member is arranged in the housing to exert a force on the switchable fiber during shape restoration in a direction tending to push the switchable fiber into a first position of the first channel.

In a preferred embodiment, biasing means in the housing exert a force on the switchable fiber in a direction opposite to that of the first member and tends to push the switchable fiber into a second position of the first channel. The force exerted by the biasing means is sufficient to achieve the second position of the switchable fiber when the temperature of the first member is below the second temperature and the force exerted by the first member when heated above the first temperature is sufficient to overcome the force of the biasing means and to achieve the first position of the switchable fiber.

In one embodiment, the biasing means is a fixed member of the switch housing that contacts the switchable fiber and pushes it into the second position. In a second embodiment, the biasing means is a positive spring member arranged to push the switchable fiber into the second position. In a third embodiment, the biasing means is a second member also made of a shape memory material. In the third embodiment, the first and second members are heated and cooled above and below the first and second temperatures, respectively, in opposite phases to achieve switch operation and release.

Means are provided for heating and cooling the first member, and the second member in the third embodiment, above and below the first and second temperatures, respectively. Preferably this heating and cooling is achieved by selectively supplying and removing electrical current to the first and second members.

DETAILED DESCRIPTION

Figure 1:
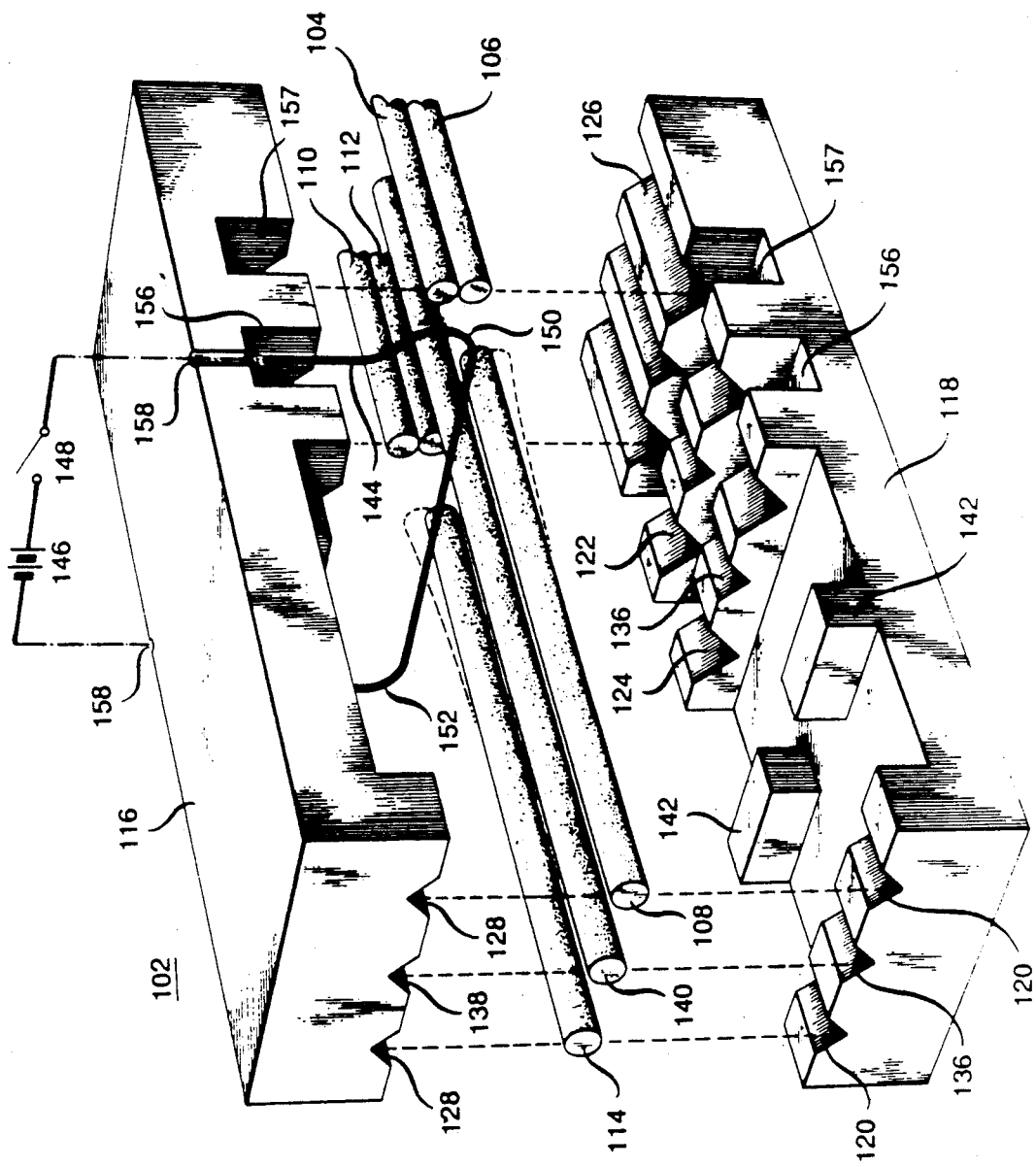
FIG. 1 shows an exploded view of a switch, including the optical fibers, that uses a fixed biasing member to push a switchable fiber into a second position and a shape memory alloy wire to push the switchable fiber into the first position.

In FIG. 1, a switch is shown as a double pole switch. That is, two sets of fibers are switched and released at the same time. However, this is not a limitation of the invention. In principle, any number of sets of fibers may be switched. Two fixed optical fibers 104 and 106 enter a switch housing 102 from one side of the switch assembly. On the opposite side, a switchable fiber 108 enters housing 102 and is optically aligned (switched) with one or the other of the fixed fibers 104 and 106. As mentioned above, a second set of fibers 110, 112 and 114 also enter the switch housing 102. However, since the details of operation are identical for the second set of fibers, the discussion will proceed only with respect to the first set. In the following discussion, reference is made only to a single switch element, it being understood that, in principle, any number of switch elements may be contained in a single assembly.

The switch housing 102 comprises two base members 116 and 118. These base members may be made of metal, plastic or other suitable material. A number of colinear vee groove sections 120, 122, 124 and 126 support and align switchable fiber 108 and fixed fiber 106. Base member 116 contains matching vee groove sections 128, 130, 132 and 134. Grooves 120 and 128 are of sufficient depth to fixedly contact and hold the switchable fiber 108 when the base members are brought together. Actually, the depth of the groove sections 120 and 128 are chosen such that the base members 120 and 128 do not touch each other, but are slightly separated when brought together. This is to insure that the fiber 108 is positively clamped. The remaining groove sections 122, 124, 126 and the corresponding mates in base member 116 are greater in depth sufficiently to clamp the two fixed fibers 104 and 106. In addition, both base members 116 and 118 may have mating aligning vee grooves 136 and 138, respectively, for receiving an alignment fiber 140. Other means of aligning the base members together may be provided, if desired. In the embodiment of FIG. 1, a biasing member 142 contacts the switchable fiber 108 when the switch is assembled and pushes the fiber up into groove sections 130 and 132 and into alignment with fixed fiber 106. It should be understood that, in principle, a biasing means is not strictly required. For instance, the switch of FIG. 1 is arranged such that the switchable fiber 108 is always bent slightly upwards or downwards for alignment with fibers 104 and 106, respectively. However, the switch could be arranged such that switchable fiber 108 aligns with fiber 104, for example, under neutral conditions and without the need for biasing means.

The vee grooves were made with a 90 degree single point diamond tool in a modified Hauser Jig Borer. Using one way motion of this machine as a planer, successive rough cuts of 8 micron depth were made in lucite to form grooves and the grooves were finished with a 0.25 micron depth of cut. Grooves cut by this method can yield accuracies better than 0.05 micron with surface roughness of below 0.01 micron. These grooved base members may be replicated using electroforming techniques and subsequent injection molding with a suitably filled resin to lower the coefficient of expansion. Using this technique, vee grooves can be inexpensively made with comparable or better accuracy than optically defined anisotropically etched silicon vee grooves.

In accordance with the invention, FIG. 1 shows a wire 144 made of a shape memory alloy (SMA) material also positioned traverse to the vee grooves in base member 118. Preferably, the SMA material is TiNi, a well known titanium and nickel shape memory alloy. Wire 144 functions as a spring when the wire is heated. The ends of the SMA wire are electrically connected to an external source of current, here represented by a battery 146, via some type of switching element, represented here as switch 148. When the switch 148 is operated, current flows through the wire 144, causing it to heat. As a result, the wire 144 tries to straighten in the area of its bent sections 150 and 152. This, in turn, pushes the section of the wire 144 that traverses the switchable fiber 108 down into the groove sections 122 and 124 and into alignment with fixed fiber 106. When switch 148 is opened and current ceases to flow, the wire 144 cools, the wire sections 150 and 152 retract the traverse section of the wire and the switchable fiber 108 returns to the groove sections in the upper base member 116 under its own resiliency and because of biasing member 142.

Figure 2:
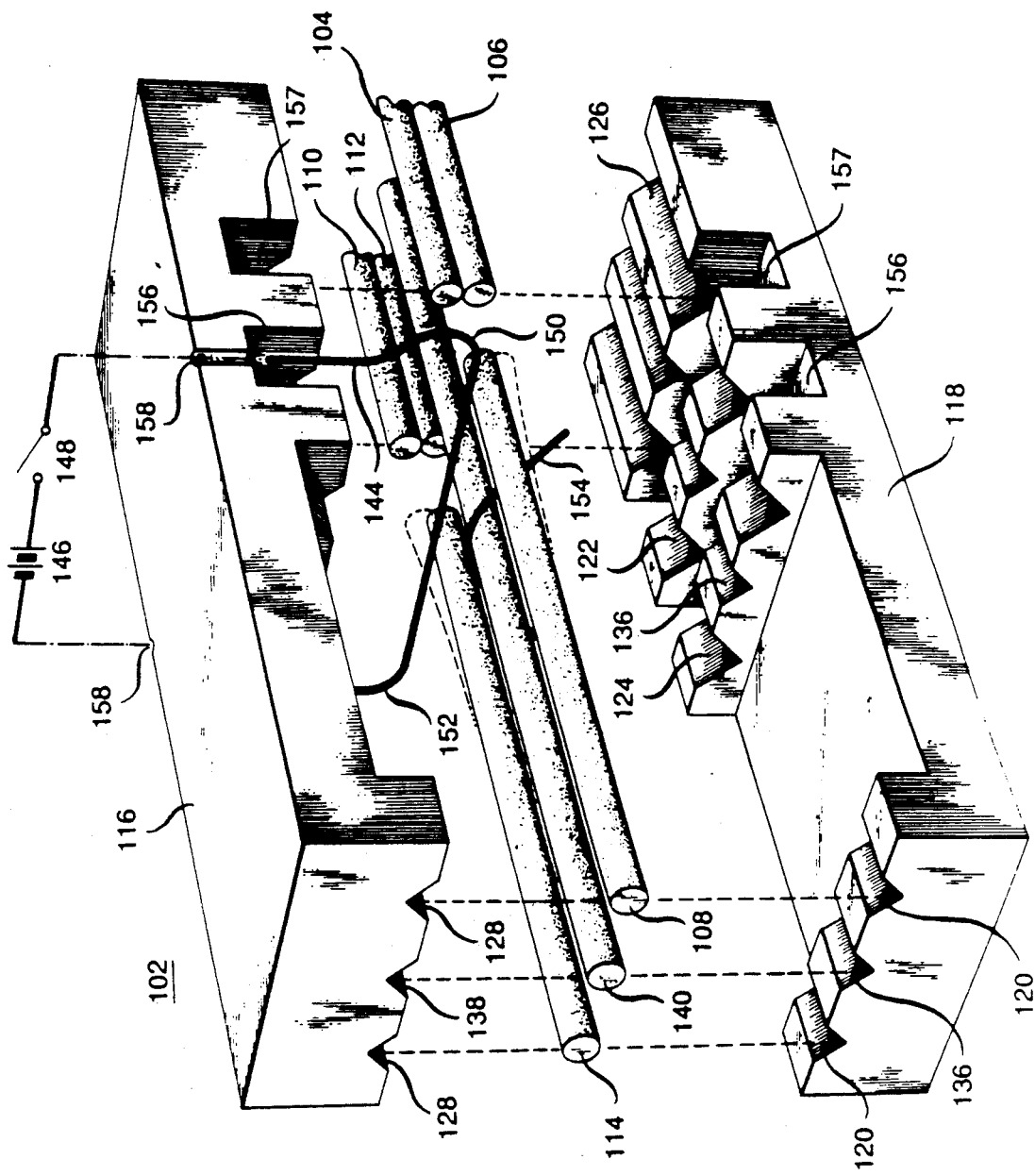
FIG. 2 shows an exploded view of a switch, including the optical fibers, that uses a biasing spring member to push a switchable fiber into the second position and a shape memory alloy wire to push the switchable fiber into the first position.

FIG. 2 shows an embodiment which is essentially identical to that of FIG. 1, except that the fixed biasing members 142 are replaced with a biasing spring member 154. In a switch actually made, this spring member 154 was a piece of optical fiber, although other spring material could be used as well. An end of the spring member 154 is placed under switchable fiber 108 and routed over alignment fiber 140. In a prototype witch, the biasing spring was not secured. For a production switch, the biasing spring would probably be secured in some satisfactory manner, as for example, being glued to the alignment fiber 140. When current is not supplied to the SMA wire 144, the bias spring 154 exerts a sufficient upward force on the switchable fiber 108 to position the fiber in the groove of base member 118, thereby to optically align it with the fixed fiber 106. When current is supplied to the SMA wire by operation of switch 148, the wire is thermally heated. The bent sections 150 and 152 of the wire try to straighten as explained above. In so doing, the downward force exerted by the SMA wire 144 overcomes the upward force of the bias spring 154. As a result, the switchable fiber 108 is forced down into the groove of base member 118 into optical alignment with fixed fiber 106.

To assemble the above switch, the optical fibers are placed on base member 118. An external jig holds the fibers in place, making assembly easier. Alignment of the fibers can be visually observed through aperture 157 in base members 116 and 118. The biasing spring is inserted through aperture 156. When base member 116 is attached, the fibers are held securely in place by the vee groove sections 120, 128 and 126, 134. After base members 116 and 118 are clamped together, the SMA wire 144 is inserted through aperture 156 and glued into place in recesses 158 in the side walls of the switch. In practice, optical fibers of 5 mils diameter and an SMA wire of 0.003 inch were used.

One minor disadvantage of the switches of FIGS. 1 and 2 is that the operate and release response times of the switch are different. This is due to the fact that the heating and cooling intervals required for operation and release are different. In general, the required cooling interval is longer than the heating interval and the release time of the switch is slower than the operate time. This is avoided in the embodiment of FIG. 3, in which two opposing SMA springs 144 and 160 are employed. The SMA wire 160 on base member 118 is identical to that already discussed in the first embodiment. SMA wire 160 is also electrically connected to a supply of electrical current 162 via a switch element 164. To operate this illustrative fiber switch, switch element 148 is closed to supply current to SMA wire 144, while switch element 164 is held in its open position. To release the fiber switch, the switched states of switch elements 148 and 164 are reversed. Thus, both the operated and released states of the fiber switch are achieved through heating of a different SMA wire. The result is that the release time of the switch is faster than that of the embodiments of FIGS. 1 and 2 and is approximately equal to the response time required for operating the fiber switch.

Figure 3:
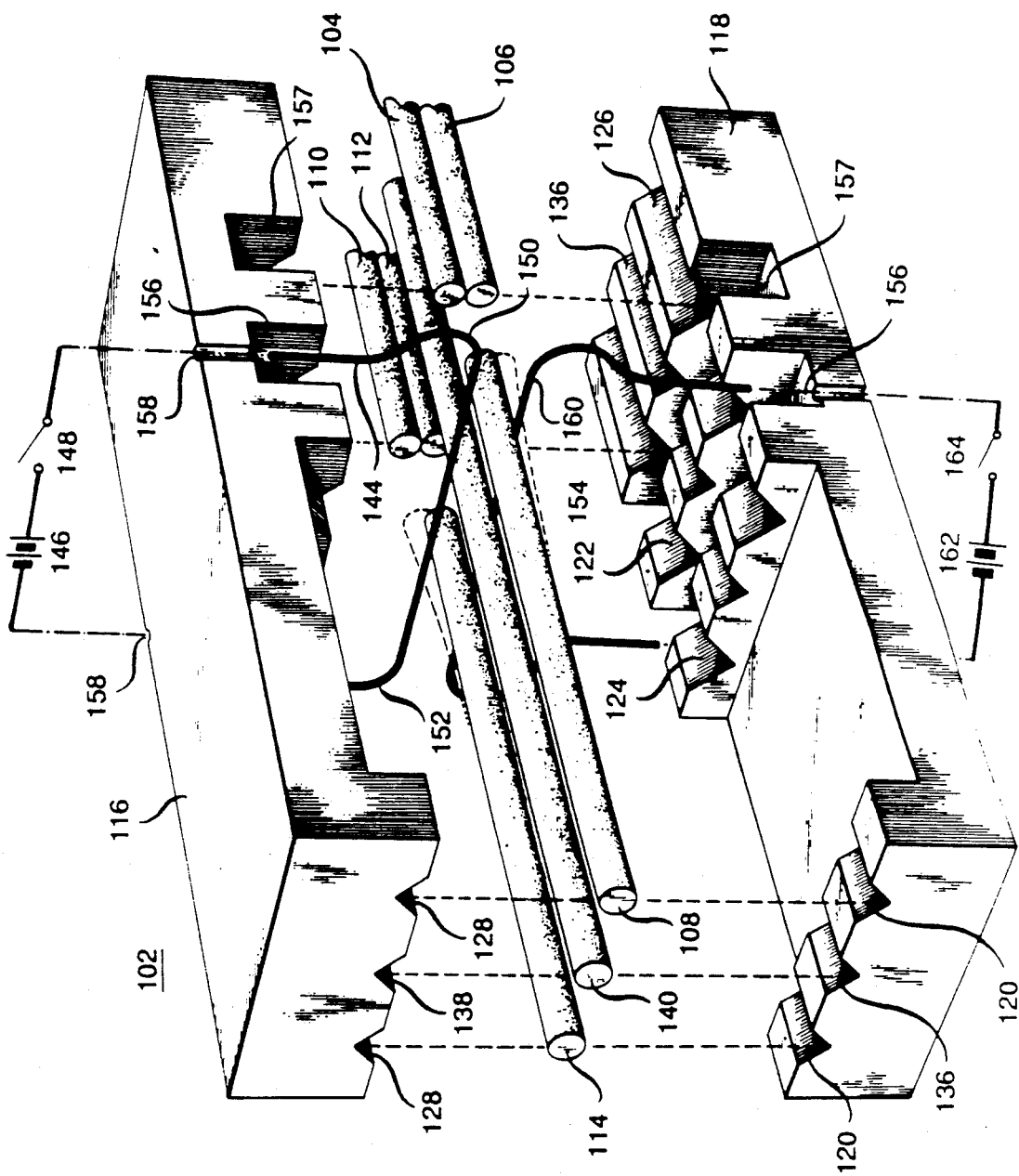
FIG. 3 shows an exploded view of a switch, including the optical fibers, that uses two shape memory wires that are heated and cooled in opposite phases to push the switchable fiber into the first and second positions.

In practice, the switches of FIGS. 1 through 3 would be encapsulated after assembly for further protection.

It is understood that the above described arrangements are merely illustrative of the application of principles of the invention and that other arrangements may be devised by workers skilled in the art without departing from the spirit and scope of the invention.

I claim:

1. An optical fiber switch comprising a switch housing having an internal first channel extending from an outside surface of the housing for receiving a first switchable fiber having a first end and a second channel extending from an outside surface of the housing for receiving a second fiber having a second end, the second channel including a first portion extending beyond the second end, the first end being movable into the first portion of the second channel and being in optical alignment with the second end when therein, the switch being characterized by a first member made of a shape memory material having the property of restoration substantially to an original state when heated above a first temperature after being distorted while below a second temperature, this member being arranged in the housing to exert a force on the switchable fiber during shape restoration in a direction tending to push the first end into the first portion, the force exerted by the first member when heated above the first temperature being sufficient to push the first end into the first portion, and means for heating and cooling the first member above and below the first and second temperatures, respectively.

2. The switch of claim 1 wherein the first member is made of a shape memory alloy and the means for heating and cooling the first member further comprises means for selectively supplying and removing electrical current to the first member.

3. The switch of claim 1 further comprising biasing means for exerting a force on the first end in a direction opposite to that of the first member and tending to push the first end out of alignment with the second end, the force exerted by the biasing means being sufficient to push the first end out of alignment with the second end when the temperature of the first member is below the first temperature.

4. The switch of claim 3 wherein the biasing means further comprises a fixed structural element of the housing for pushing the first end out of alignment with the second end when the first member is below the second temperature.

5. The switch of claim 3 wherein the biasing means further comprises a spring element for pushing the first end out of alignment with the second end when the first member is below the second temperature.

6. The switch of claim 3 wherein the biasing means further comprises a a second member made of a shape memory material.

7. The switch of claim 6 wherein the means for heating and cooling further comprises means for heating and cooling the first and second members above and below the first and second temperatures, respectively, in opposite phases.

8. The switch of claim 7 wherein the first and second members are made of a shape memory alloy and the means for heating and cooling the first and second members further comprise means for selectively supplying and removing electrical current to the first and second members.

9. An optical fiber switch for switching an optical fiber in response to a first nonmechanical switching input comprising:

a case for receiving a first optical fiber, a second optical fiber, and first conducting means for conducting the first switching input into the case;

first securing means for securing the first optical fiber in a first fixed position such that a first end of the first optical fiber is within the case;

second securing means for securing the second optical fiber in a second fixed position within the case such that a second end of the second optical fiber is free to be moved into optical alignment with the first end; and first mechanical switching means which are within the case and are connected to the first conducting means for moving the second end into optical alignment with the first end in response to the first nonmechanical switching input.

10. The optical fiber switch as set forth in claim 9 wherein:

the first securing means includes a first channel which has a first portion which extends beyond the first end; and the first mechanical switching means responds to the first nonmechanical switching input by urging the second end into the first portion of the first channel.

11. The optical fiber switch as set forth in claim 9 wherein:

the first nonmechanical switching input causes a change of temperature in the first mechanical switching means; and the first mechanical switching means moves the second end into optical alignment with the first end in response to the change in temperature.

12. The optical fiber switch as set forth in claim 11 wherein:

the first nonmechanical switching input is an electric current; and the electric current changes the temperature of the first mechanical switching means.

13. The optical fiber switch as set forth in claim 11 wherein:

the first mechanical switching means includes a component made of a shape memory alloy.

14. The optical fiber switch as set forth in claim 9 wherein:

the second securing means further includes biasing means for biasing the second optical fiber so that the second end is not optically aligned with the first end unless the first mechanical switching means has moved the second end into optical alignment therewith.

15. The optical fiber switch as set forth in claim 9 wherein:

the optical fiber switch further responds to a second nonmechanical switching input;

the case further receives second conducting means for conducting the second switching input into the case; and the optical fiber switch further comprises:

second mechanical switching means which are within the case and are connected to the second conducting means for switching the second optical fiber by mechanically moving the second end out of optical alignment with the first end after the first mechanical switching means has mechanically moved the second end into optical alignment with the first end.

16. The optical fiber switch as set forth in claim 15 wherein:
the first nonmechanical switching input causes a first change of temperature in the first mechanical switching means;
the second nonmechanical switching input causes a second change of temperature in the second mechanical switching means;
the first mechanical switching means moves the second end into optical alignment with the first end in response to the first change in temperature;
the second mechanical switching means moves the second end out of optical alignment with the first end in response to the second change in temperature; and
the first and second nonmechanical switching inputs operate in opposite phases.

17. The optical fiber switch of claim 9 wherein:
the case further receives a third optical fiber and the optical fiber switch further comprises
third securing means for securing the third optical fiber in a third fixed position such that a third end of the third optical fiber is within the case; and
the second securing means secures the second optical fiber in the second fixed position such that the second end is optically aligned with the third end unless the first mechanical switching means have moved the second end out of alignment therewith.

18. The optical fiber switch of claim 9 wherein:
the optical fiber switch further responds to a second nonmechanical switching input;
the case further receives a third optical fiber and second conducting means for conducting the second switching input into the case; and
the optical fiber switch further comprises
third securing means for securing the third optical fiber in a third fixed position such that a third end of the third optical fiber is within the case; and
second mechanical switching means which are within the case and are connected to the second conducting means for switching the second optical fiber by moving the second end into optical alignment with the third end in response to the second nonmechanical switching input.

19. The optical fiber switch as set forth in claim 18 wherein:
the first mechanical switching means moves the second end into optical alignment with the first end in response to a first change in temperature of the first mechanical switching means;
the second mechanical switching means moves the second end into optical alignment with the third end in response to a second change in temperature of the second mechanical switching means; and
the first and second nonmechanical switching inputs operate in opposite phases.

20. Switching apparatus for switching a first end of a first optical fiber between a first position in which the first end is optically aligned with a second end of a second optical fiber and a second position in which the first end is not aligned with the second end comprising:
first means including a shape memory material which has a first shape when below a critical temperature and a second shape when above the critical temperature for directly utilizing a first force resulting from the transition between the first shape and the second shape to move the first end into the first position; and
second means including a shape memory material which has a third shape when below a critical temperature and a fourth shape when above the critical temperature for directly utilizing a second force resulting from the transition between the third shape and the fourth shape to move the first end into the second position.

21. The switching apparatus set forth in claim 20 and further comprising:
means for changing the temperatures of the first and second means across their critical temperatures in opposite phases.

22. The switching apparatus set forth in claim 21 wherein:
the means for heating the first and second means includes switchable means for providing electrical current to either the first or the second means.

23. The switching apparatus set forth in claim 20 and further comprising:
a third optical fiber having a third end, the first end being aligned with the third end in the second position, whereby the first optical fiber is switched between the second and the third optical fibers.

24. The switching apparatus set forth in claim 21 wherein:
the first and second means operate on the first optical fiber in opposition to each other;
the first force and the second force increase as the temperature is increased above the critical temperature; and
the means for heating the first means heats the first means sufficiently that the first force overcomes the second force before the temperature of the shape memory material in the second means has dropped below the critical temperature; and
the means for heating the second means heats the second means sufficiently that the second force overcomes the first force before the temperature of the shape memory material in the first means has dropped below the critical temperature.

* * * * *